(12) United States Patent
Hellbusch

(10) Patent No.: US 10,457,324 B1
(45) Date of Patent: Oct. 29, 2019

(54) ALL-WHEEL STEER TRAILER

(71) Applicant: James A. Hellbusch, Columbus, NE (US)

(72) Inventor: James A. Hellbusch, Columbus, NE (US)

(*) Notice: Subject to any disclaimer, the term of this patent is extended or adjusted under 35 U.S.C. 154(b) by 0 days.

(21) Appl. No.: 16/040,026

(22) Filed: Jul. 19, 2018

(51) Int. Cl.
*B62D 13/04* (2006.01)
*B62D 7/16* (2006.01)
*B62D 7/14* (2006.01)
*B62D 13/02* (2006.01)

(52) U.S. Cl.
CPC ............ *B62D 7/142* (2013.01); *B62D 13/025* (2013.01); *B62D 7/16* (2013.01)

(58) Field of Classification Search
CPC .......... B62D 7/142; B62D 7/16; B62D 13/02; B62D 13/025; B62D 13/04
USPC .................. 280/419, 426, 442, 443, 444
See application file for complete search history.

(56) References Cited

U.S. PATENT DOCUMENTS

| | | | |
|---|---|---|---|
| 1,938,120 A * | 12/1933 | Spohn | B62D 13/02 280/100 |
| 2,750,208 A * | 6/1956 | Henry | B62D 13/00 280/103 |
| 3,883,158 A * | 5/1975 | Fikse | B60P 3/40 280/404 |
| 4,955,630 A * | 9/1990 | Ogren | B62D 13/04 280/100 |
| 6,513,825 B2 * | 2/2003 | Ruuska | B62D 13/025 280/426 |
| 7,571,916 B2 | 8/2009 | Skiles | |
| 7,926,833 B2 | 4/2011 | Heilbusch | |
| 8,714,594 B1 * | 5/2014 | Hellbusch | A01D 75/002 280/140 |
| 9,769,981 B1 * | 9/2017 | Hellbusch | A01C 23/008 |

FOREIGN PATENT DOCUMENTS

FR   2518950   *   7/1983   ............. B62D 13/02

* cited by examiner

*Primary Examiner* — Anne Marie M Boehler
(74) *Attorney, Agent, or Firm* — Dennis L. Thomte; Thomte Patent Law Office LLC

(57) ABSTRACT

An all-wheel steer trailer is disclosed which includes an elongated frame, having a forward end and a rearward end, with the forward end of the frame having the rearward end of an elongated tongue secured thereto about a horizontal axis. The rearward end of the tongue is pivotally secured, about a horizontal axis, to a pair of wheels at the forward end of the frame. The invention includes an improved structure wherein the pivoting of the front wheels of the trailer also causes the pivoting of the rear wheels of the trailer so that the rear wheels track the front wheels of the trailer as the trailer is being turned. The trailer includes an improved means for pivoting the rear wheels of the trailer with respect to the front wheels of the trailer as the trailer is being turned.

3 Claims, 10 Drawing Sheets

ALL-WHEEL STEER TRAILER

BACKGROUND OF THE INVENTION

Field of the Invention

This invention relates to an all-wheel steer trailer and more particularly to an all-wheel steer trailer which is ideally suited for use in the agricultural industry to support combine or forage harvester headers thereon or fertilizer tanks thereon.

Description of the Related Art

Dual axle trailers have long been provided wherein the front axle or axles and the rear axle or axles are pivoted in opposite directions relative to a main frame when the front axle or axles is pivoted in one direction or another so that the rear wheels track the front wheels. An all-wheel steer trailer is disclosed in U.S. Pat. No. 7,571,916. Applicant has previously received U.S. Pat. No. 7,926,833 which represented an improvement in the art. Although Applicant's prior patent represents an improvement in the art, the instant invention represents a further improvement in the art.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An all-wheel steer trailer is disclosed which includes a substantially horizontally disposed frame with a first frame member, having a forward end and a rearward end, and a second frame member, having a forward end and a rearward end. A first cross-member is secured to the first and second frame members at the forward ends thereof and a second cross-member is secured to the first and second frame members rearwardly of the first cross-member. The second cross-member has a vertically disposed opening formed therein. A plurality of cross-members are secured to the first and second frame members so as to extend therebetween in a horizontally spaced-apart manner rearwardly of the second cross-member.

The trailer of this invention includes a gooseneck hitch having a horizontally disposed upper hitch member having a rearward end, a forward end and a vertically disposed hitch member having an upper end and a lower end. The rearward end of the upper hitch member is secured to the first cross-member so as to extend forwardly therefrom. The upper end of the vertically disposed hitch member is secured to the forward end of the upper hitch member. A horizontally disposed plate is secured to the lower end of the vertically disposed hitch member. The plate at the lower end of the vertically disposed hitch member has a central opening formed therein. A vertically disposed king pin, having an upper end and a lower end, is disclosed with the upper end of the king pin being secured to the lower end of the vertically disposed hitch member and which extends downwardly therefrom through the central opening in the plate.

A front axle support is disclosed having a forward end, a rearward end, an upper end, a lower end, a first side and a second side. An elongated tongue, having a forward end and a rearward end, has its rearward end pivotally secured, about a horizontal axis, to the front axle support. A first wheel is rotatably secured to the front axle support at the first side thereof and a second wheel is rotatably secured to the front axle support at the second side thereof.

The plate at the lower end of the vertically disposed hitch member is rotatably positioned on the upper end of the front axle support whereby the king pin extends downwardly through the upper plate of the front axle support. The trailer of this invention also includes a turn plate assembly, having a forward end and a rearward end, with the turn plate assembly including a horizontally disposed base plate having a forward end, a rearward end, an inner end and an outer end. The turn plate assembly includes a horizontally disposed tube, having a forward end and a rearward end, at the inner end of the base plate. The turn plate assembly also includes a horizontally disposed support plate positioned above the tube. The turn plate assembly also includes a vertically disposed king pin extending upwardly from the support plate thereof. The king pin rotatably extends upwardly through the vertically disposed opening in the second cross-member. The trailer also includes an elongated steering rod, having a forward end and a rearward end, with the steering rod slidably extending through the tube in the turn plate assembly whereby the forward end of the steering rod is positioned forwardly of the tube of the turn plate assembly and so that the rearward end of the steering rod is positioned rearwardly of the tube of the turn plate assembly. The forward end of the steering rod is pivotally secured to the rearward end of the first axle support.

The trailer also includes an elongated tie rod, having forward and rearward ends, with the forward end of the tie rod being pivotally secured to the outer end of the base plate of the turn plate assembly. A first spindle support is secured to the first frame member at the rearward end thereof with the first spindle support including a vertically disposed tube having an upper end and a lower end. A second spindle support is secured to the second frame member at the rearward end thereof. The second spindle support includes a vertically disposed tube having an upper end and a lower end. A first spindle assembly is also described including a horizontally disposed first mounting plate having a forward end and a rearward end. A vertically disposed first spindle, having a lower end and an upper end, is described with the lower end of the first spindle being secured to the first mounting plate whereby the first spindle extends upwardly from the first mounting plate. A second spindle assembly is also described including a horizontally disposed second mounting plate having a forward end and a rearward end. A vertically disposed second spindle is also provided having a lower end and an upper end with the lower end of the second spindle being secured to the second mounting plate whereby the second spindle extends upwardly from the second mounting plate. The first and second spindles are horizontally spaced apart.

The trailer also includes an elongated rear tie rod having a first end and a second end with the first end of the rear tie rod being pivotally secured to the rearward end of the first mounting plate and with the second end of the rear tie rod being pivotally secured to the rearward end of the second mounting plate. The first spindle rotatably extends upwardly through the tube of the first spindle support and the second spindle rotatably extends upwardly through the tube of the second spindle support.

The trailer also includes a first axle having an inner end and an outer end with the first axle being positioned below the first mounting plate of the first spindle assembly and being secured to the first mounting plate thereof. A left rear wheel is rotatably mounted on the under of the first axle. A second axle is also provided having an inner end and an outer end with the second axle being positioned below the second mounting plate of the second spindle assembly and being secured to the second mounting plate thereof. The rearward end of the tie rod is pivotally secured to the inner end of the second axle. A right rear wheel is rotatably mounted on the outer end of the second axle.

When the tongue extends forwardly from the front axle support, the wheels of the front axle support will be in the position of FIG. 4. If the tongue is turning to the right as viewed in FIG. 5, the rear wheels will be in the position as seen in FIG. 5. If the tongue is pivoted to the position of FIG. 6, the rear wheels will be in the position of FIG. 6.

It is therefore a principal object of the invention to provide an improved all-wheel steer trailer.

It is a further object of the invention to provide an all-wheel steer trailer which includes an improved means for pivoting the rear wheels of the trailer in response to the pivoting of the front wheels of the trailer to reduce the turning radius of the trailer.

A further object of the invention is to provide a trailer including a narrow fifth wheel front axle which steers the rear wheels of the trailer.

A further object of the invention is to provide an all-wheel steer trailer which includes a steering rod which extends through a secondary pivot area.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 9:
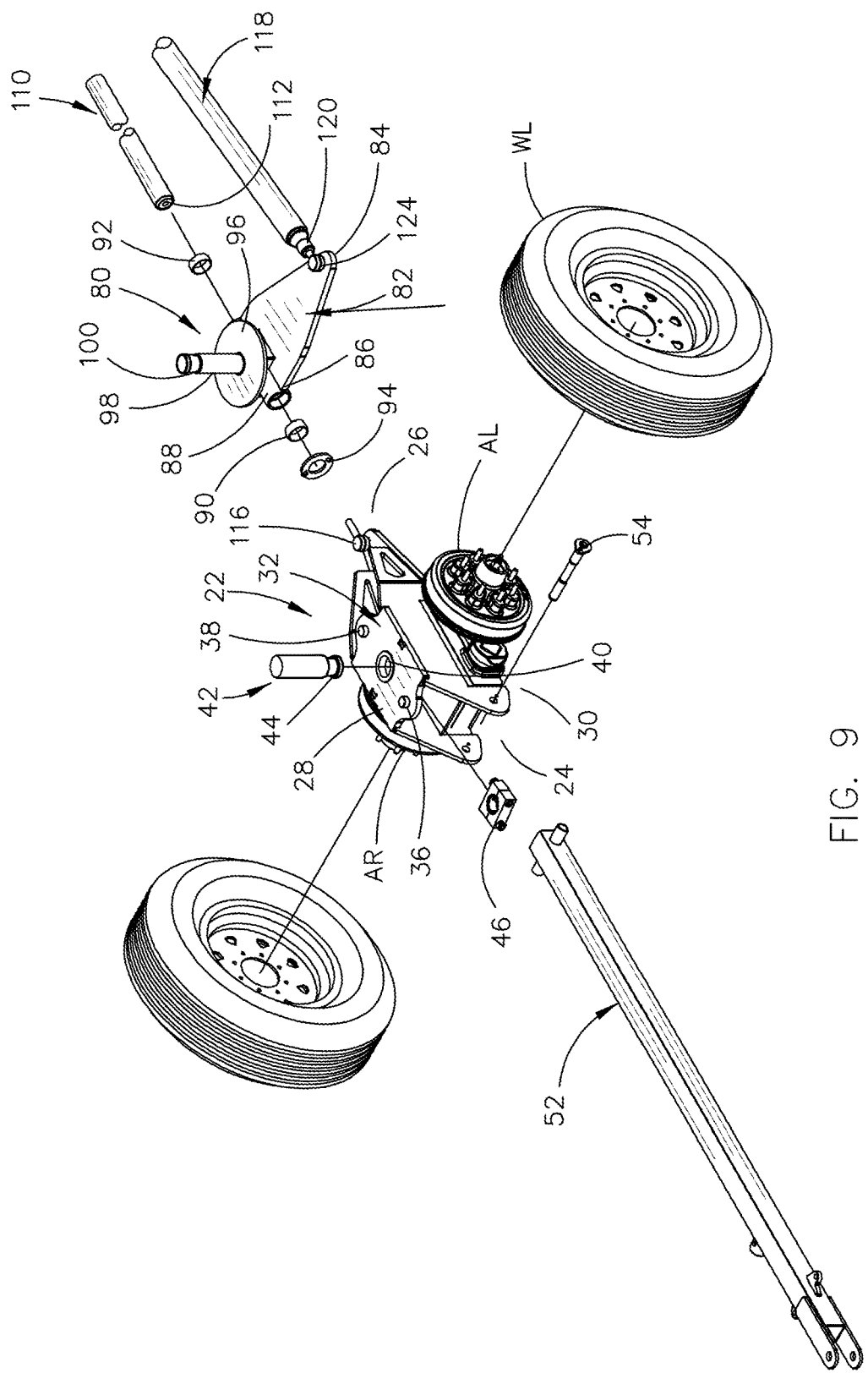
FIG. 9 is a partial exploded perspective view of the forward end of the trailer of this invention.
Figure 10:
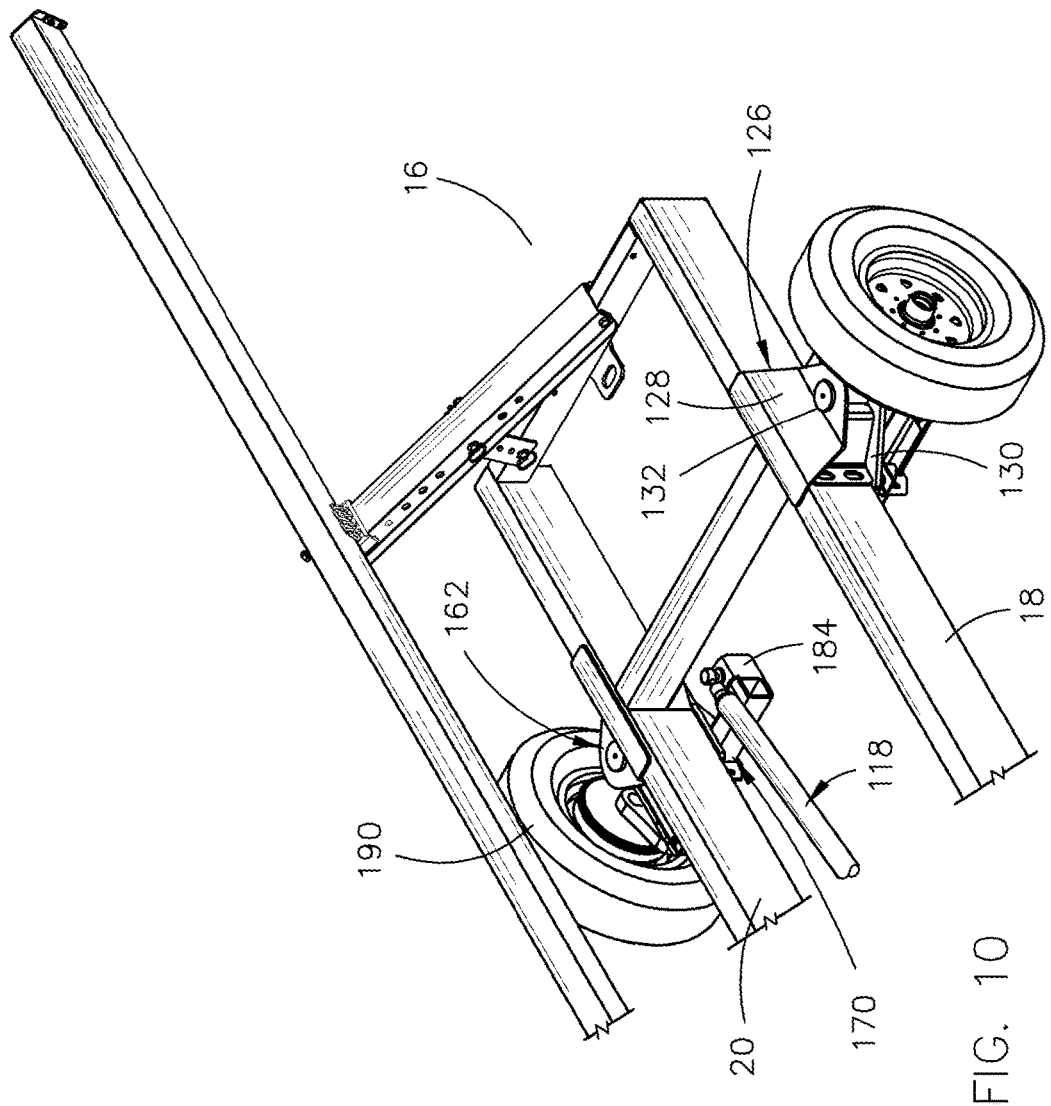
FIG. 10 is a partial perspective view of the rearward end of the trailer of this invention.
Figure 11:
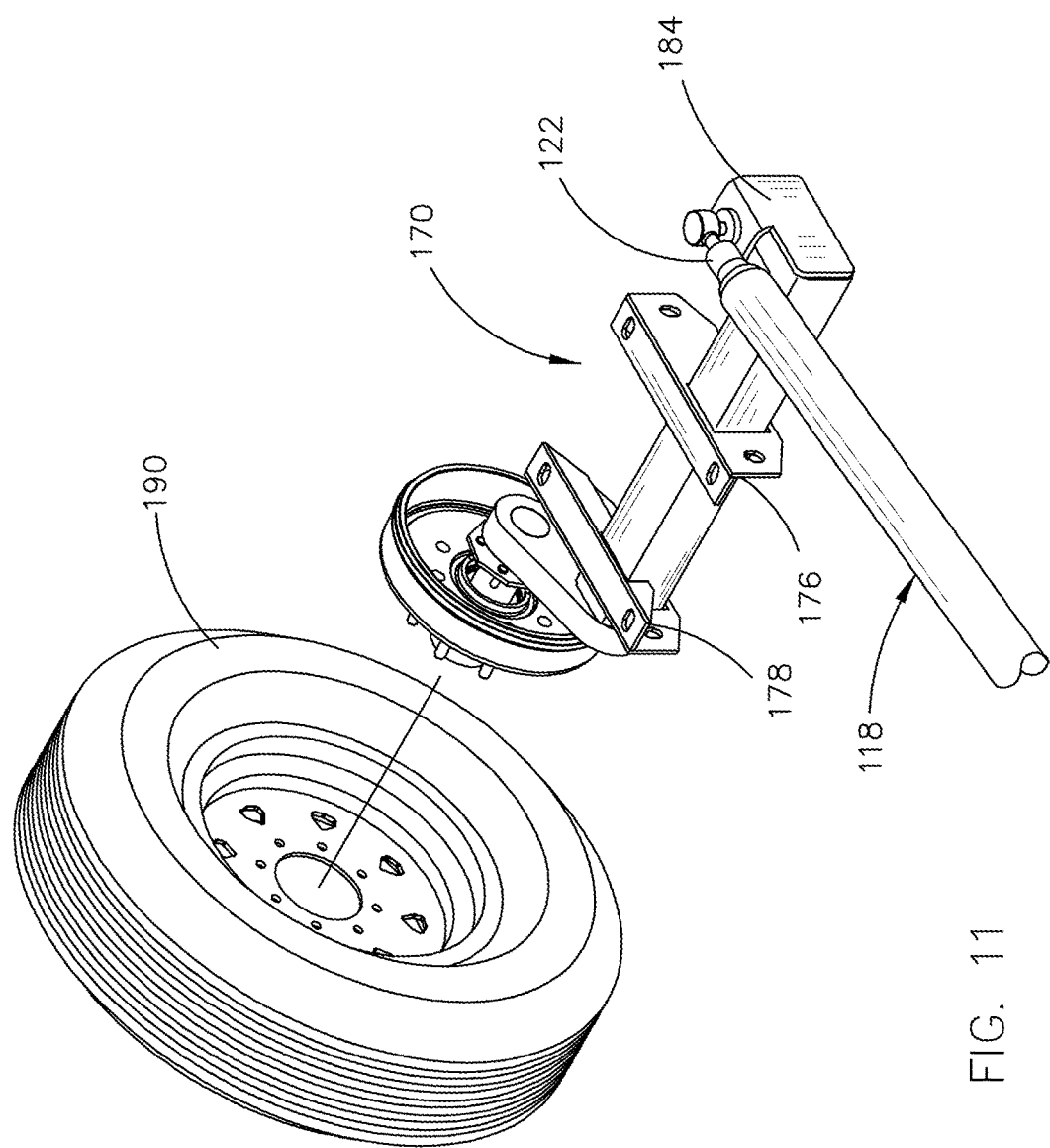
FIG. 11 is a partial exploded perspective view of the rearward end of the trailer of this invention.
Figure 12:
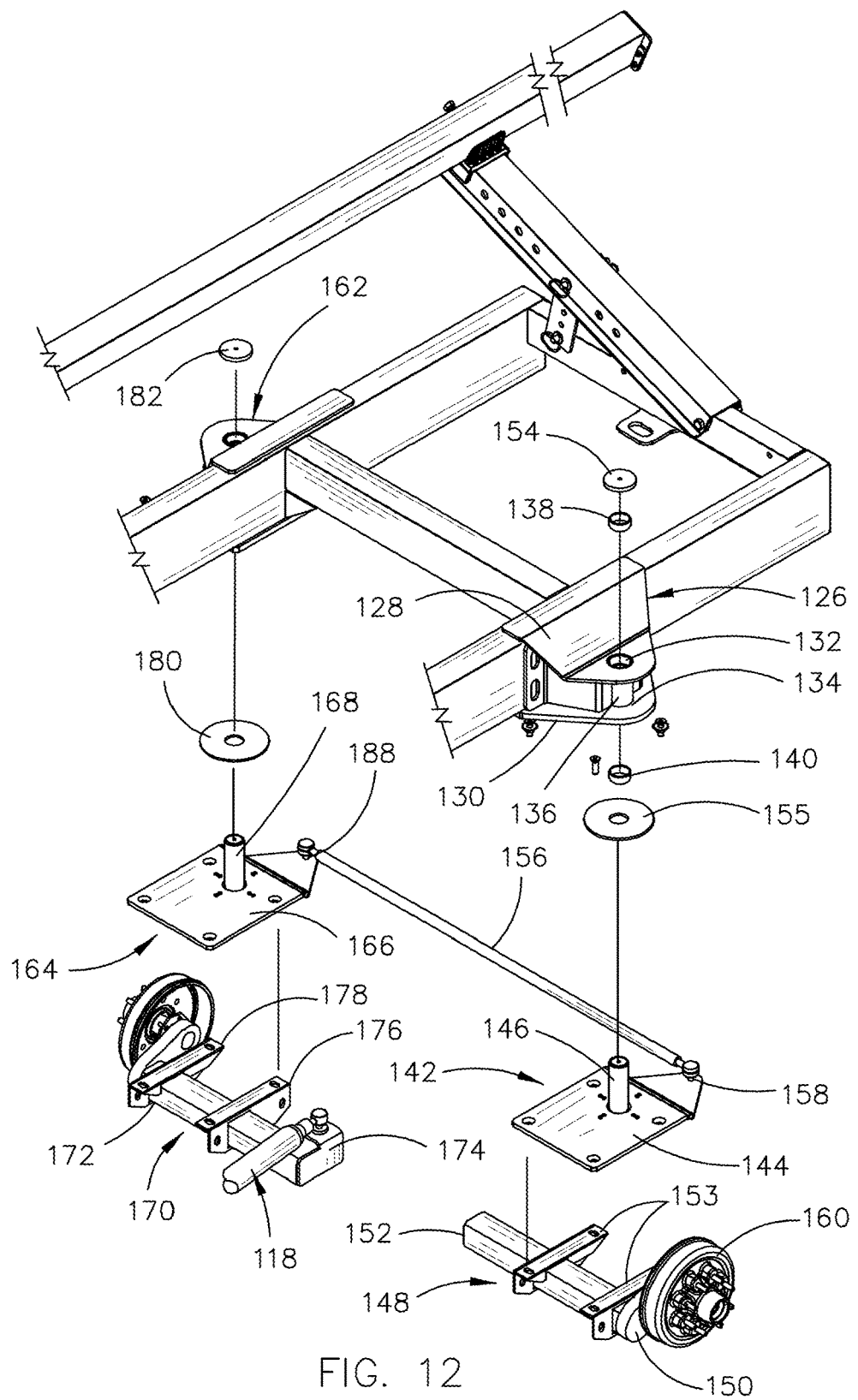
FIG. 12 is a partial exploded perspective view of the rearward end of the trailer of this invention.

The numeral 10 refers to the all-wheel steer trailer of this invention which includes a substantially horizontally disposed and elongated frame 12 having a forward end 14, a rearward end 16, a left frame member 18 and a right frame member 20. The numeral 22 refers to a front axle support having a forward end 24, a rearward end 26, an upper end 28 and a lower end 30. A horizontally disposed plate 32 is positioned at the upper end 28 of front axle support as seen in FIG. 9. Plate 32 will be described as having a forward end 34. A stop 36 extends upwardly from plate 32 at the forward end thereof (FIG. 10). A stop 38 extends upwardly from plate 32 at the rearward end thereof (FIG. 10). Plate 32 has a central opening 40 formed therein (FIG. 10). The numeral 42 refers to a king pin which is received in opening 40. King pin 42 has an annular groove 44 at its lower end. A king pin lock block 46 embraces groove 44 of king pin 42 below plate 32 to maintain king pin 42 in plate 32. A wear pad 48 is positioned on plate 32. The rearward end 50 of an elongated tongue 52 is pivotally secured, about a horizontal axis, to front axle support 22 by a pivot pin 54. The forward end 56 of tongue 52 is configured to be secured to the hitch of a vehicle, such as a truck, tractor, etc. in conventional fashion.

Figure 7:
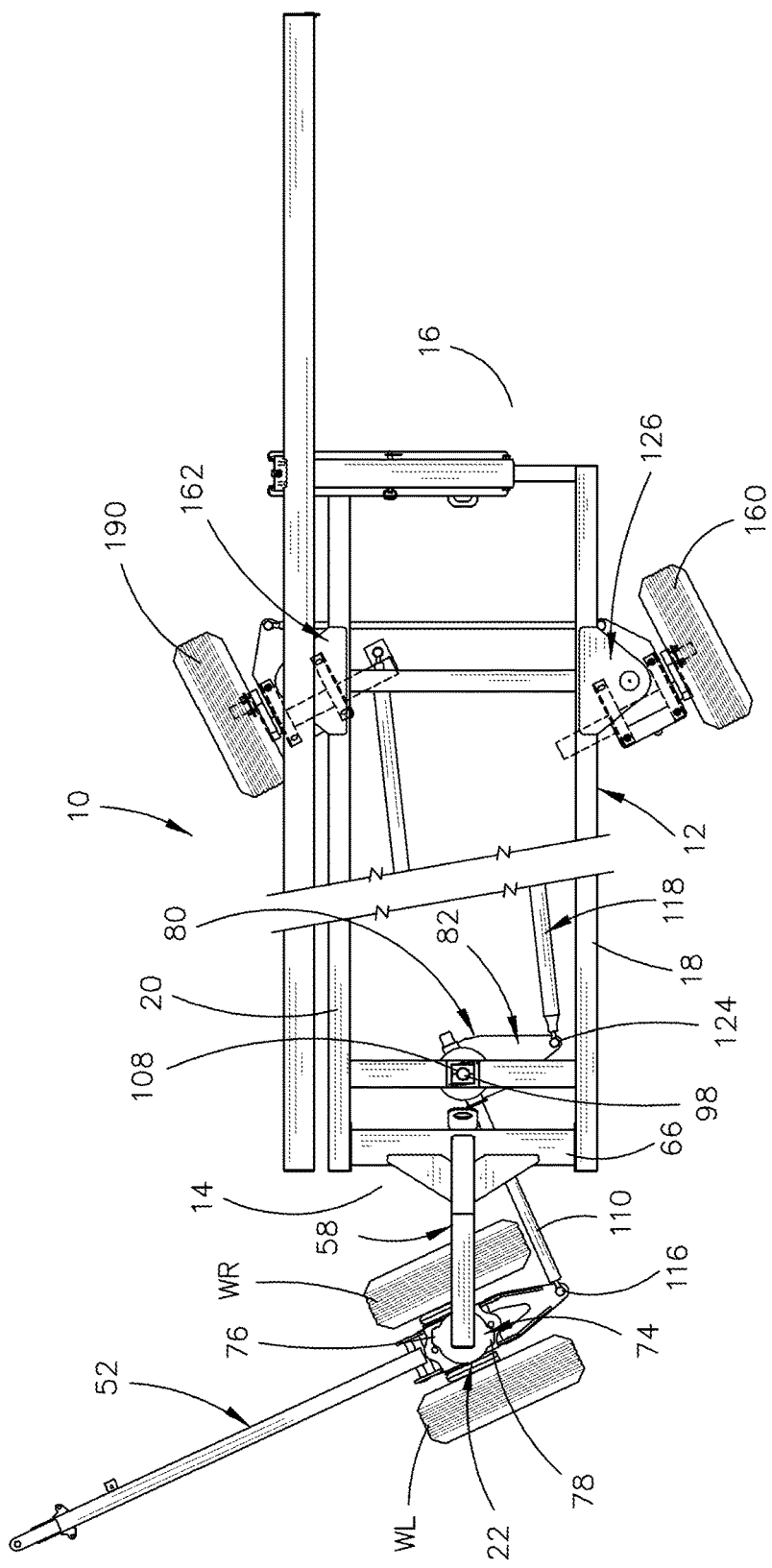
FIG. 7 is a partial top view of the trailer of this invention which is turning to the right.
Figure 8:
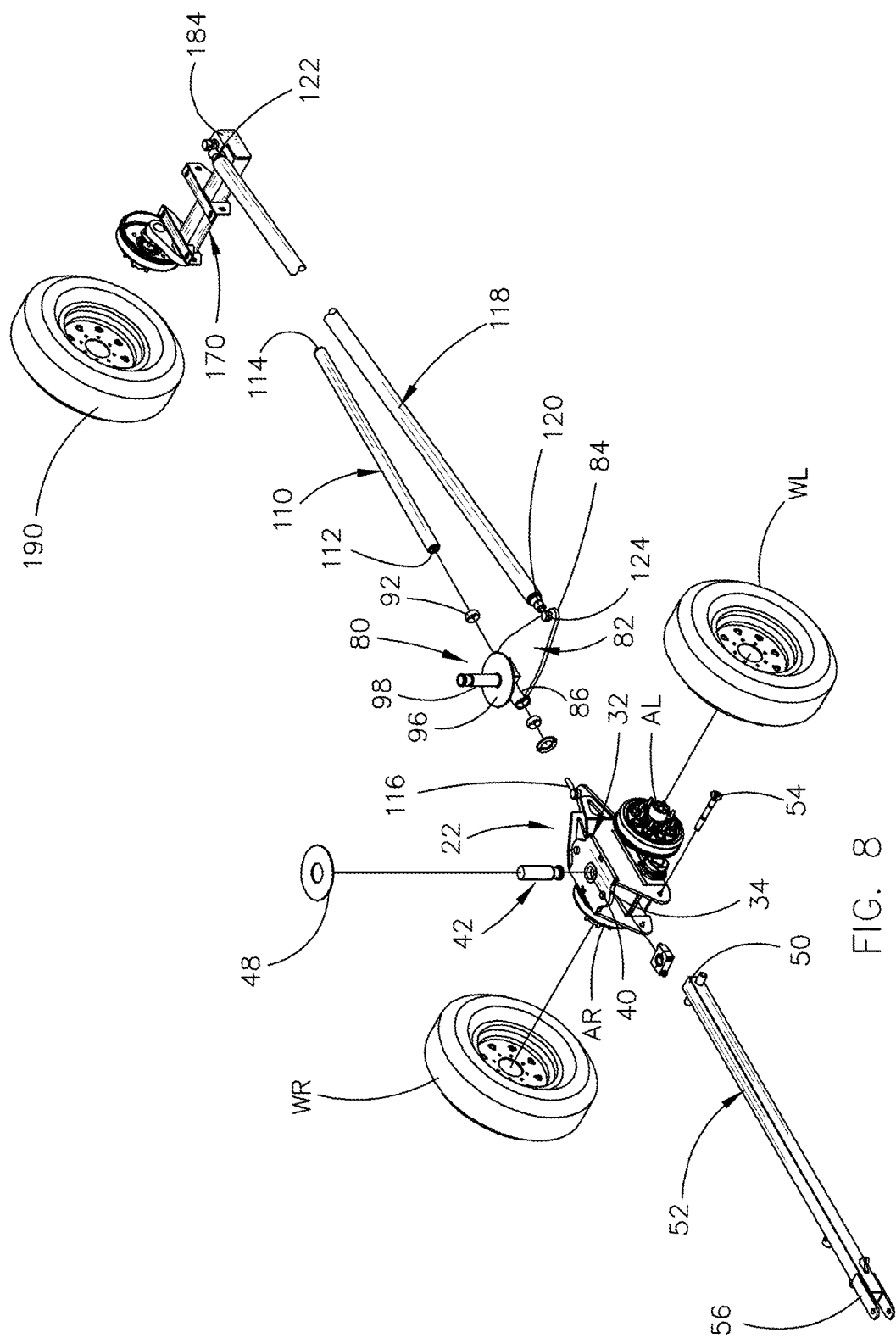
FIG. 8 is a partial exploded perspective view of the trailer of this invention.

Trailer 10 includes a gooseneck hitch 58 at the forward end thereof. Hitch 58 includes a horizontally disposed tubular hitch member 60 having a forward end 62 and a rearward end 64. The rearward end 64 of hitch member 60 is welded to a cross frame member 66 which is secured to the forward ends of frame members 68 and 70 of frame 12. Hitch 58 also includes a vertically disposed tubular hitch member 72 which is secured to the forward end 62 of hitch member 60 by welding and which extends downwardly therefrom. A connector plate 74 is welded to the lower end of hitch member 72 and has a pair of stops 76 and 78 extending therefrom with the stops 76 and 78 being approximately 180 degrees apart (FIG. 7). The upper end of king pin 42 is welded to the lower end of hitch member 72 and extends downwardly through plate 74, through wear pad 48 and into the opening 40 formed in plate 32. The plate 74, the hitch member 72 and king pin 42 are rotatable with respect to plate 32.

Axles AL and AR are mounted at the sides of front axle support 22 in conventional fashion and have wheels WL and WR rotatably mounted thereon respectively in conventional fashion.

The numeral 80 refers to a turn plate assembly which is positioned rearwardly of the front axle support 22. Assembly 80 includes a horizontally disposed base plate 82 having a left end 84 and a right end 86. Base plate 82 has a tube 88 welded thereto at end 86. Bushings 90 and 92 are positioned in the ends of tube 88 and are maintained therein by a bushing keeper 94. A horizontally disposed turn plate 96 is welded to the base plate 82 above tube 88. A vertically disposed king pin 98 is secured to the assembly 80 at the center of turn plate 96. King pin 98 has an annular recess 100 formed therein at its upper end.

The numeral 102 refers to a wear pad which embraces king pin 98 and is positioned on plate 96. King pin 98 extends upwardly through an opening 104 formed in crossmember 106 which extends between frame members 68 and 70 rearwardly of cross-member 66. A king pin lock 108 is secured to the upper end of king pin 98 to maintain king pin 98 in position.

The numeral 110 refers to an elongated steering rod having a forward end 112 and a rearward end 114. The forward end 112 of steering rod 110 is pivotally secured to a post 116 which is secured to the rearward end 26 of front axle support 22 and which extends upwardly therefrom. As seen, steering rod 110 slidably extends rearwardly through the tube 88 and the bushings 90 and 92 in tube 88.

The numeral 118 refers to an elongated tie rod having a forward end 120 and a rearward end 122. The forward end 120 of tie rod 118 is pivotally secured to an upstanding post 124 which extends upwardly from base plate 82 at end 84 thereof.

The numeral 126 refers to a spindle support which is secured to frame member 18 forwardly of the rearward end of frame member 18. Spindle support 126 includes an upper plate 128 and a lower plate 130. Plate 128 has an opening 132 formed therein at the outer end thereof. Plate 130 has an opening 134 formed therein which is aligned with opening 132. A tube 136 is secured to plates 128 and 130 so that the tube 136 registers with openings 132 and 134. Bushings 138 and 140 are positioned in tube 136.

The numeral 142 refers to a spindle assembly which includes a mounting plate 144 and a spindle 146 which extends upwardly from plate 144. Plate 144 is fixedly secured to an axle 148 having an outer end 150 and an inner end 152. Plate 144 is secured to supports 153, which are secured to axle 148, by bolts or screws extending downwardly through openings in plate 144 and into openings formed in supports 153. Spindle 146 extends upwardly through the bushings 140 and 138 and the tube 136. A spindle and bushing keeper 154 is secured to the upper end of spindle 146 and which has a larger diameter than the opening 132. As seen, a wear pad 155 is positioned on plate 146. A rear tie rod 156 has one end thereof pivotally secured to a post 158 which extends upwards from mounting plate 144. A wheel 160 is secured to the axle 148.

The numeral 162 refers to a spindle support which is secured to frame member 70 forwardly of the rearward end of frame member 70. Spindle support 162 is identical to spindle support 126 and will not be described in detail.

The numeral 164 refers to a spindle assembly which includes a mounting plate 166 and a spindle 168 which extends upwardly from plate 166. Plate 166 is fixedly secured to an axle 170 having an outer end 172 and an inner end 174. Axle 170 has a pair of supports 176 and 178 secured thereto. The plate 166 of spindle assembly 164 is secured to the supports 176 and 178 by bolts or screws. Spindle 168 extends upwardly through the wear pad 180 and bushings in the tube of spindle support 162. A spindle and bushing keeper 182 is secured to the upper end of spindle 168.

Axle 170 has a bracket 184 secured to its inner end. A post 186 extends upwardly from bracket 184. The rearward end 122 of the tie rod 118 is pivotally secured to the post 186 on bracket 184. The outer end of the rear tie rod 156 is pivotally secured to a post 188 which extends upwardly from mounting plate 166. A wheel 190 is secured to the outer end of axle 170.

Figure 1:
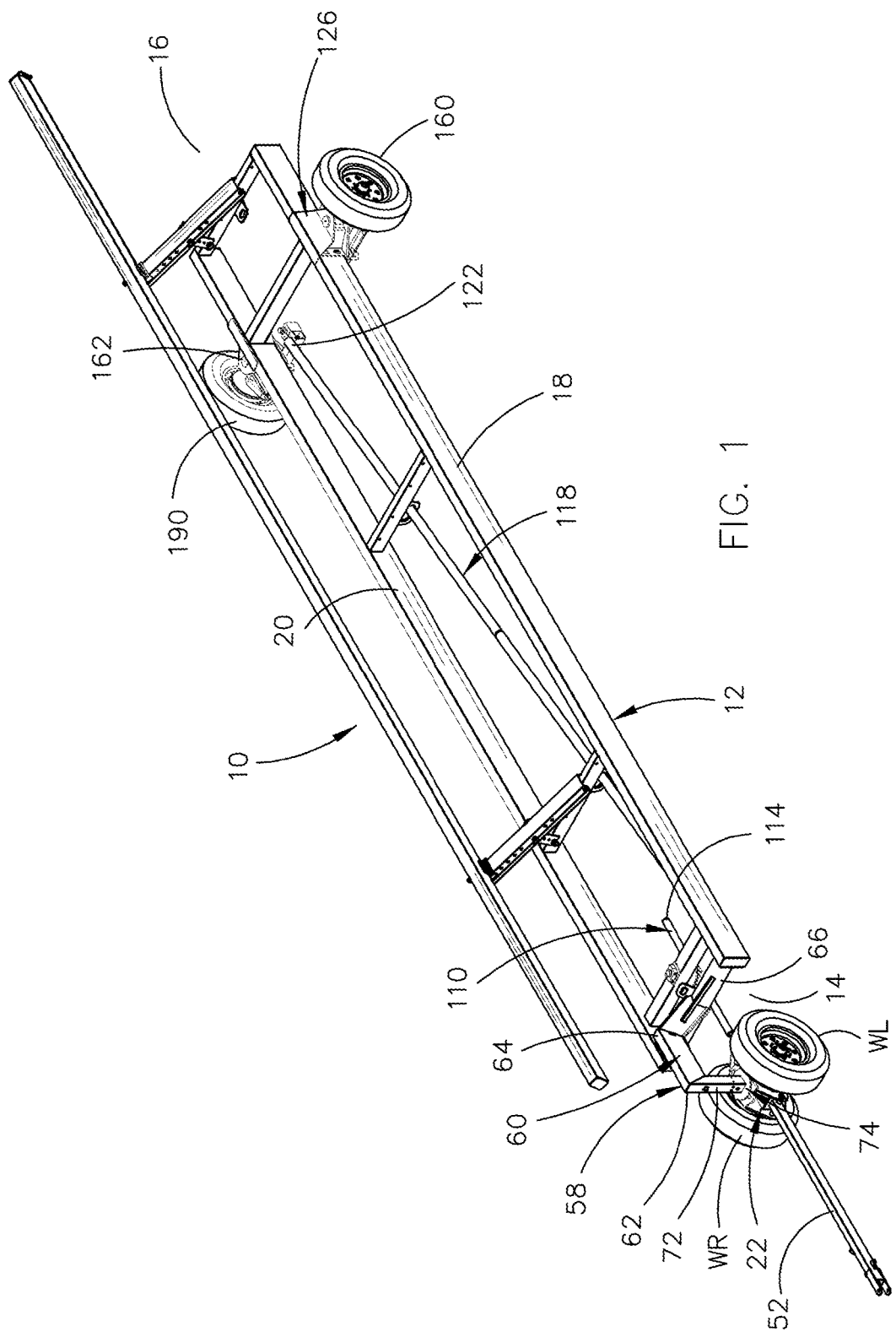
FIG. 1 is a perspective view of the trailer of this invention.
Figure 2:
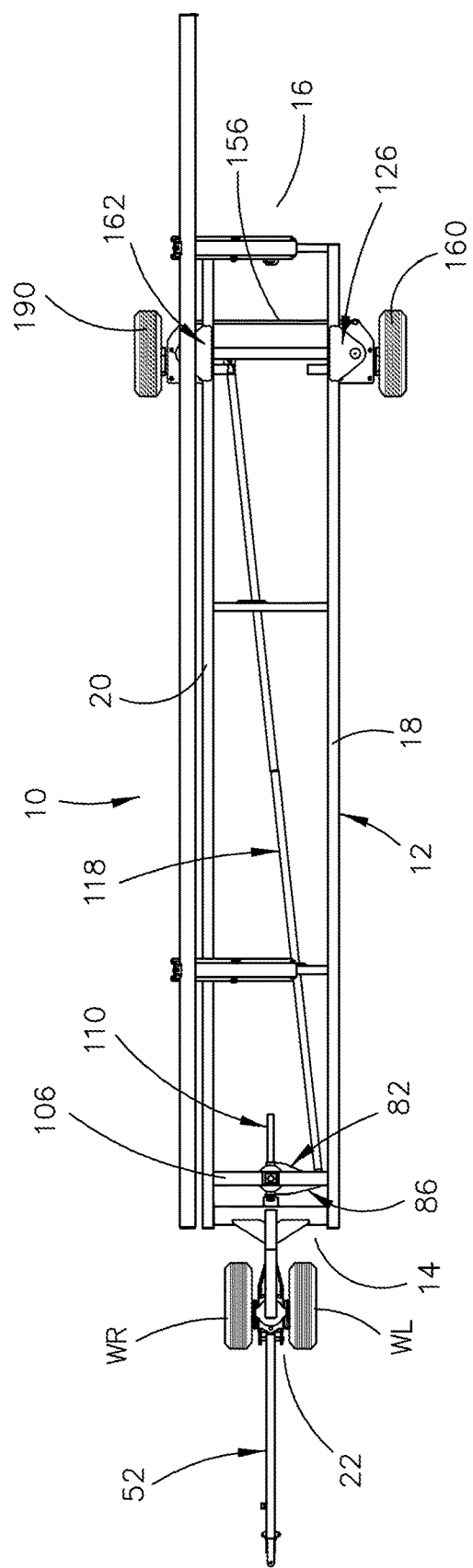
FIG. 2 is a top view of the trailer of this invention.
Figure 3:
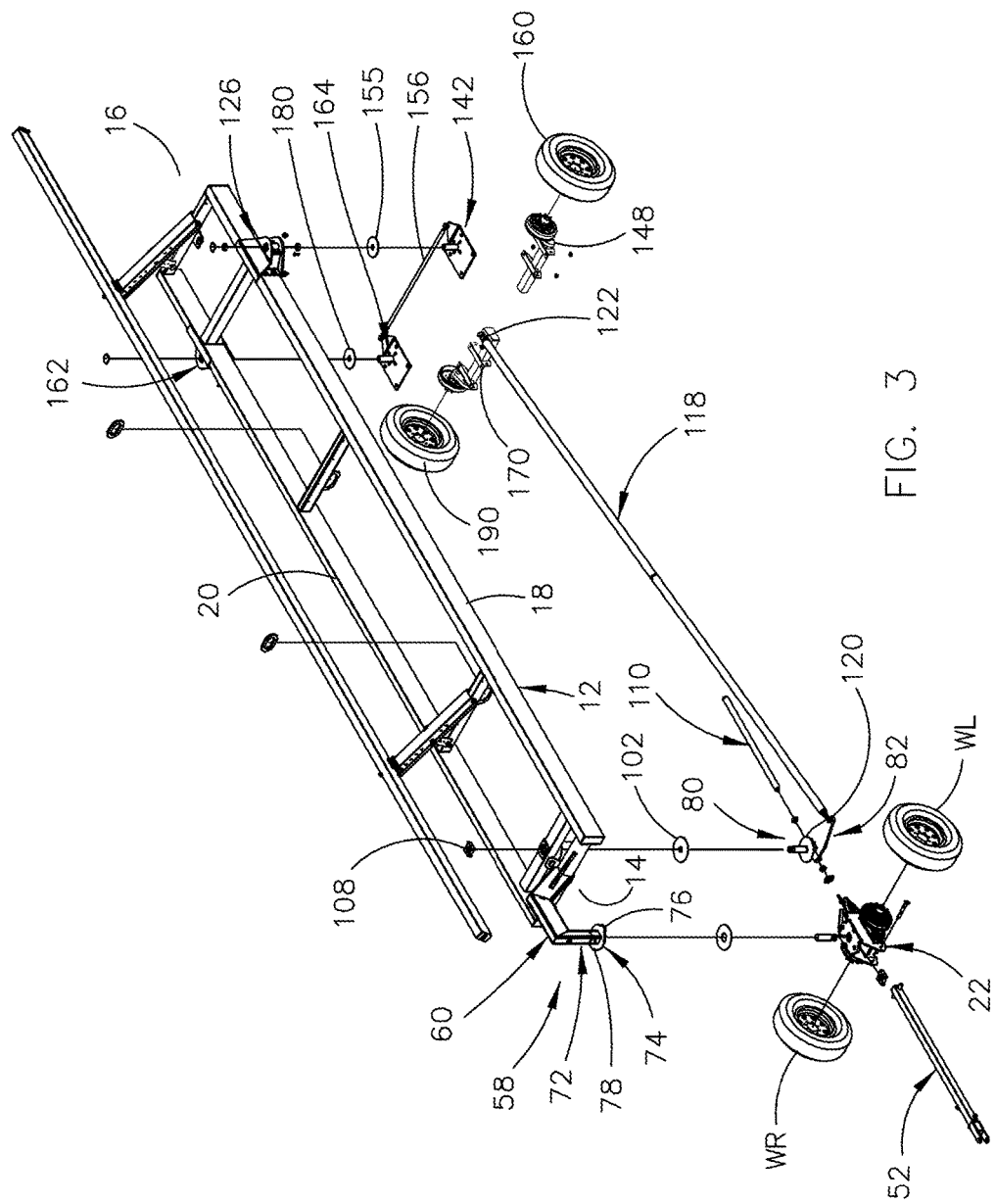
FIG. 3 is an exploded perspective view of the trailer of this invention.
Figure 4:
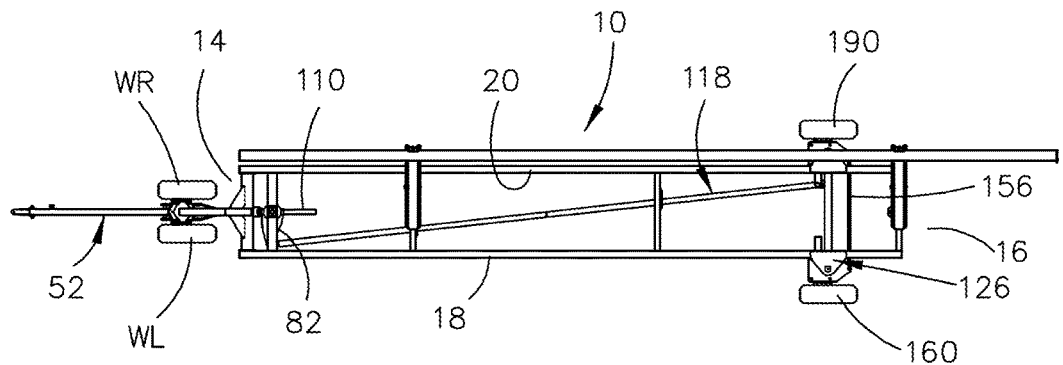
FIG. 4 is a top view of the trailer of this invention in a non-turning position.
Figure 5:
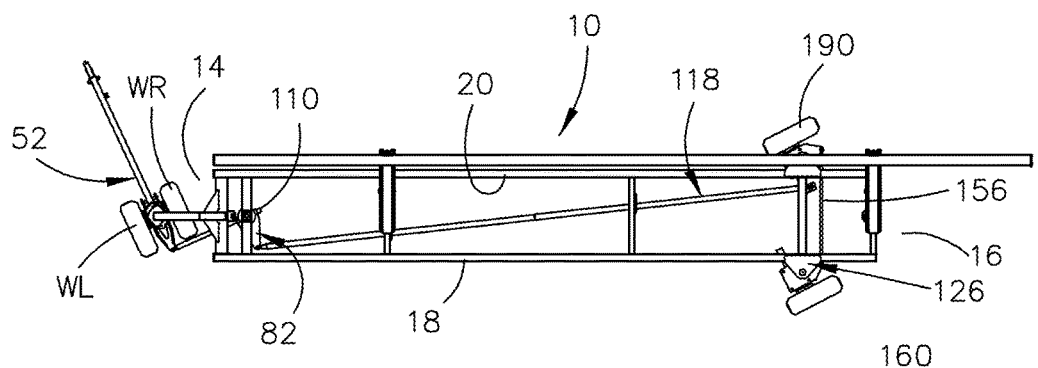
FIG. 5 is a top view of the trailer of this invention which is turning to the right.
Figure 6:
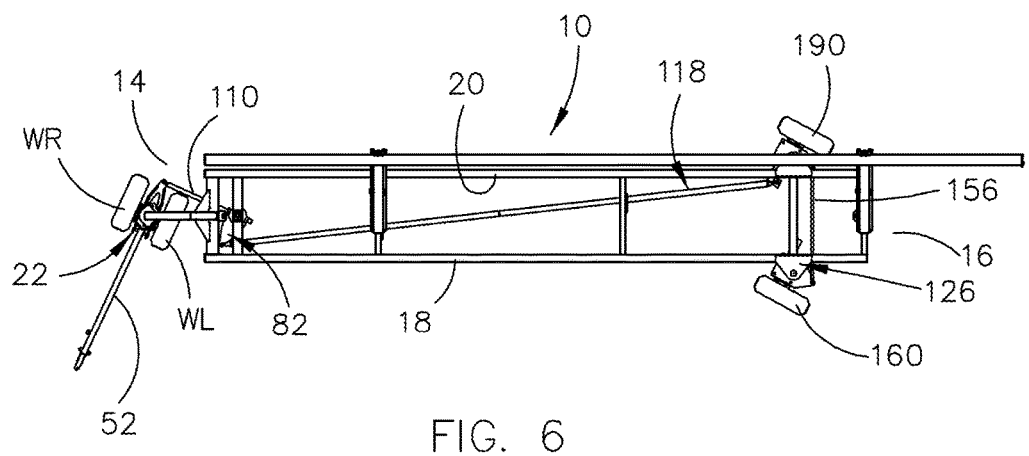
FIG. 6 is a top view of the trailer of this invention which is turning to the left.

As seen in FIG. 2, when the trailer 10 is traveling in a straight forward direction, the front wheels WL and WR are heading straight forwardly as are the wheels 160 and 190. If the trailer 10 is turning to the right by the tongue 52, the wheels WL and WR are turned to the right as seen in FIG. 5. At that same time, the wheels 160 and 190 will be turned to the left as seen in FIG. 5. If the trailer 10 is turning to the left as seen in FIG. 6, the wheels WL and WR will be turned to the left as seen in FIG. 6. The efficient turning of the rear wheels 160 and 190 results in the trailer 10 being able to negotiate sharp or regular corners. The steering rod 110 enables the efficient pivoting of the rear wheels 160 and 190 due to the offset connection of the tie rod 118 to a turn plate assembly 80.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An all-wheel steer trailer, comprising:
   a substantially horizontally disposed frame having a forward end, a rearward end, a first side and a second side;
   said frame including:
   (a) an elongated first frame member having a forward end and a rearward end;
   (b) an elongated second frame member having a forward end and a rearward end which is horizontally spaced from said first frame member;
   (c) a first cross-member secured to said first and second frame members at said forward ends thereof;
   (d) a second cross-member secured to said first and second frame members rearwardly of said first cross-member;
   (e) said second cross-member having a vertically disposed opening formed therein; and
   (f) a plurality of cross-members secured to said first and second frame members so as to extend therebetween in a horizontally spaced-apart manner rearwardly of said second cross-member;
   a gooseneck hitch having a horizontally disposed upper hitch member having a rearward end, a forward end and a vertically disposed hitch member having an upper end and a lower end;
   said rearward end of said upper hitch member being secured to said first cross-member so as to extend forwardly therefrom;
   said upper end of said vertically disposed hitch member being secured to said forward end of said upper hitch member;
   a horizontally disposed plate secured to said lower end of said vertically disposed hitch member;
   said plate at said lower end of said vertically disposed hitch member having a central opening formed therein;
   a vertically disposed first king pin, having an upper end and a lower end;
   said upper end of said first king pin being secured to said lower end of said vertically disposed hitch member and which extends downwardly therefrom through said central opening in said plate;
   a front axle support having a forward end, a rearward end, an upper end, a lower end, a first side and a second side;
   an elongated tongue having a forward end and a rearward end;
   said rearward end of said tongue being pivotally secured, about a horizontal axis, to said front axle support;

a first wheel rotatably secured to said front axle support at said first side thereof;
a second wheel rotatably secured to said front axle support at said second side thereof;
said plate at said lower end of said vertically disposed hitch member being rotatably positioned on said upper end of said front axle support whereby said first king pin extends downwardly through said upper end of said front axle support;
a turn plate assembly having a forward end and a rearward end;
said turn plate assembly including a horizontally disposed base plate having a forward end, a rearward end, an inner end and an outer end;
said turn plate assembly including a horizontally disposed tube, having a forward end and a rearward end, at said inner end of said base plate;
said turn plate assembly including a horizontally disposed support plate positioned above said tube;
said turn plate assembly also including a vertically disposed second king pin extending upwardly from said support plate thereof;
said second king pin rotatably extending upwardly through said vertically disposed opening in said second cross-member;
an elongated steering rod having a forward end and a rearward end;
said steering rod slidably extending through said tube in said turn plate assembly whereby said forward end of said steering rod is positioned forwardly of said tube of said turn plate assembly and so that said rearward end of said steering rod is positioned rearwardly of said tube of said turn plate assembly;
said forward end of said steering rod being pivotally secured to said rearward end of said front axle support;
an elongated tie rod having forward and rearward ends;
said forward end of said tie rod being pivotally secured to said outer end of said base plate of said turn plate assembly;
a first spindle support secured to said first frame member at said rearward end of said first frame member;
said first spindle support including a vertically disposed tube having an upper end and a lower end;
a second spindle support secured to said second frame member at said rearward end of said second frame member;
said second spindle support including a vertically disposed tube having an upper end and a lower end;
a first spindle assembly including a horizontally disposed first mounting plate having a forward end and a rearward end;
a vertically disposed first spindle having a lower end and an upper end;
said lower end of said first spindle being secured to said first mounting plate whereby said first spindle extends upwardly from said first mounting plate;
a second spindle assembly including a horizontally disposed second mounting plate having a forward end and a rearward end;
a vertically disposed second spindle having a lower end and an upper end;
said lower end of said second spindle being secured to said second mounting plate whereby said second spindle extends upwardly from said second mounting plate;
said first and second spindles being horizontally spaced-apart;
an elongated rear tie rod having a first end and a second end;
said first end of said rear tie rod being pivotally secured to said rearward end of said first mounting plate;
said second end of said rear tie rod being pivotally secured to said rearward end of said second mounting plate;
said first spindle rotatably extending upwardly through said tube of said first spindle support;
said second spindle rotatably extending upwardly through said tube of said second spindle support;
a first axle having an inner end and an outer end;
said first axle being positioned below said first mounting plate of said first spindle assembly and being secured to said first mounting plate thereof;
a left rear wheel rotatably mounted on said outer end of said first axle;
a second axle having an inner end and an outer end;
said second axle being positioned below said second mounting plate of said second spindle assembly and being secured to said second mounting plate thereof;
said rearward end of said tie rod being pivotally secured to said inner end of said second axle; and
a right rear wheel rotatably mounted on said outer end of said second axle.

2. The trailer of claim 1 wherein said upper end of said front axle support has first and second horizontally spaced-apart stops extending upwardly therefrom and wherein said plate at said lower end of said vertically disposed hitch member has first and second horizontally spaced-apart stops extending therefrom wherein said first and second stops which extend upwardly from said front axle support and said stops of said plate at said lower end of said vertically disposed hitch member cooperate to limit the pivotal movement of said front axle support with respect to said gooseneck hitch.

3. An all-wheel steer trailer, comprising:
a substantially horizontally disposed frame having a forward end, a rearward end, a first side and a second side;
said frame including:
 (a) an elongated first frame member having a forward end and a rearward end;
 (b) an elongated second frame member having a forward end and a rearward end which is horizontally spaced from said first frame member;
 (c) a first cross-member secured to said first and second frame members at said forward ends thereof;
 (d) a second cross-member secured to said first and second frame members rearwardly of said first cross-member;
 (e) said second cross-member having a vertically disposed opening formed therein; and
 (f) a plurality of cross-members secured to said first and second frame members so as to extend therebetween in a horizontally spaced-apart manner rearwardly of said second cross-member;
a gooseneck hitch having a horizontally disposed upper hitch member having a rearward end, a forward end and a vertically disposed hitch member having an upper end and a lower end;
said rearward end of said upper hitch member being secured to said first cross-member so as to extend forwardly therefrom;
said upper end of said vertically disposed hitch member being secured to said forward end of said upper hitch member;
a horizontally disposed plate secured to said lower end of said vertically disposed hitch member;

said plate at said lower end of said vertically disposed hitch member having a central opening formed therein;

a vertically disposed first king pin, having an upper end and a lower end;

said upper end of said first king pin being secured to said lower end of said vertically disposed hitch member and which extends downwardly therefrom through said central opening in said plate;

a front axle support having a forward end, a rearward end, an upper end, a lower end, a first side and a second side;

an elongated tongue having a forward end and a rearward end;

said rearward end of said tongue being pivotally secured, about a horizontal axis, to said front axle support;

a first wheel rotatably secured to said front axle support at said first side thereof;

a second wheel rotatably secured to said front axle support at said second side thereof;

said plate at said lower end of said vertically disposed hitch member being rotatably positioned on said upper end of said front axle support whereby said first king pin extends downwardly through said upper end of said front axle support;

a turn plate assembly having a forward end and a rearward end;

said turn plate assembly including a horizontally disposed base plate having a forward end, a rearward end, an inner end and an outer end;

said turn plate assembly including a horizontally disposed tube, having a forward end and a rearward end, at said inner end of said base plate;

said turn plate assembly including a horizontally disposed support plate positioned above said tube;

said turn plate assembly also including a vertically disposed second king pin extending upwardly from said support plate thereof;

said second king pin rotatably extending upwardly through said vertically disposed opening in said second cross-member;

an elongated steering rod having a forward end and a rearward end;

said steering rod slidably extending through said tube in said turn plate assembly whereby said forward end of said steering rod is positioned forwardly of said tube of said turn plate assembly and so that said rearward end of said steering rod is positioned rearwardly of said tube of said turn plate assembly;

said forward end of said steering rod being pivotally secured to said rearward end of said front axle support;

a first rear wheel pivotally and rotatably mounted on said first frame member forwardly of said rearward end of said first frame member;

a second rear wheel pivotally and rotatably mounted on said second frame member forwardly of said rearward end of said second frame member;

an elongated tie rod having forward and rearward ends;

said forward end of said tie rod being pivotally secured to said outer end of said base plate of said turn plate assembly;

said rearward end of said tie rod being operatively connected to said first and second rear wheels for pivoting said first and second rear wheels in response to the pivoting of said front axle support and said turn plate assembly.

\* \* \* \* \*